United States Patent
Novak et al.

(10) Patent No.: US 9,454,694 B2
(45) Date of Patent: Sep. 27, 2016

(54) DISPLAYING AND INSERTING HANDWRITING WORDS OVER EXISTING TYPESET

(71) Applicant: Lenovo (Singapore) Pte. Ltd., Singapore (SG)

(72) Inventors: Joshua Neil Novak, Wake Forest, NC (US); Steven Richard Perrin, Raleigh, NC (US); Jianbang Zhang, Cary, NC (US); Russell Speight VanBlon, Raleigh, NC (US); Sarah Jane E Cox, Raleigh, NC (US); Jonathan Jen-Wei Yu, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 58 days.

(21) Appl. No.: 14/580,975

(22) Filed: Dec. 23, 2014

(65) Prior Publication Data
US 2016/0180161 A1    Jun. 23, 2016

(51) Int. Cl.
*G06K 9/00* (2006.01)
*G06T 11/60* (2006.01)

(52) U.S. Cl.
CPC .......... *G06K 9/00402* (2013.01); *G06T 11/60* (2013.01)

(58) Field of Classification Search
CPC ..... G09G 2340/12; G09G 5/02; G09G 5/377
USPC ........................................................ 382/189
See application file for complete search history.

(56) References Cited

U.S. PATENT DOCUMENTS

2014/0075302 A1* 3/2014 Akashi .................. G06K 9/222
                                                                  715/268

* cited by examiner

*Primary Examiner* — Manuchehr Rahmjoo
(74) *Attorney, Agent, or Firm* — Ference & Associates LLC

(57) ABSTRACT

One embodiment provides a method, including: accepting, in an overlay input application, one or more ink strokes provided to an input field overlay area; wherein the input field overlay area is located on top of an underlying application display; and providing, in the input field overlay area, an at least partially opaque background. Other embodiments are described and claimed.

16 Claims, 4 Drawing Sheets

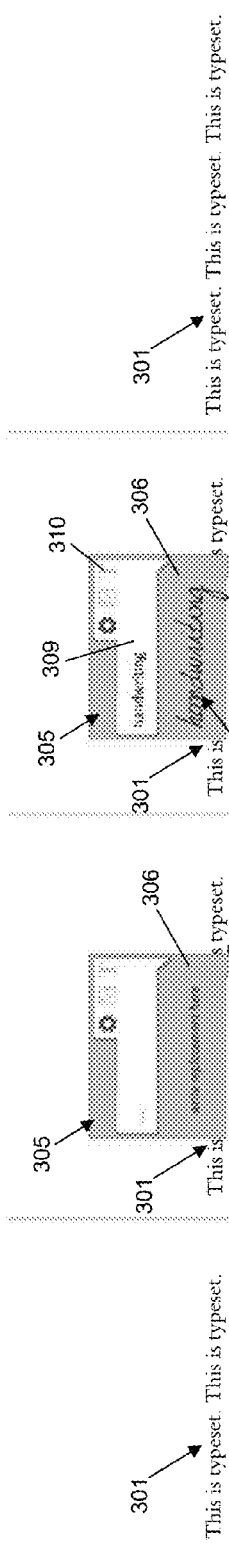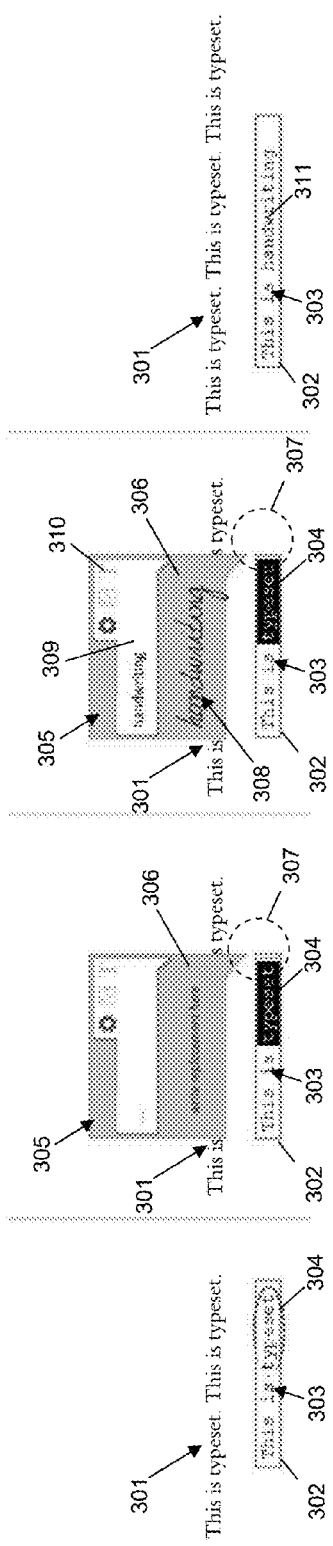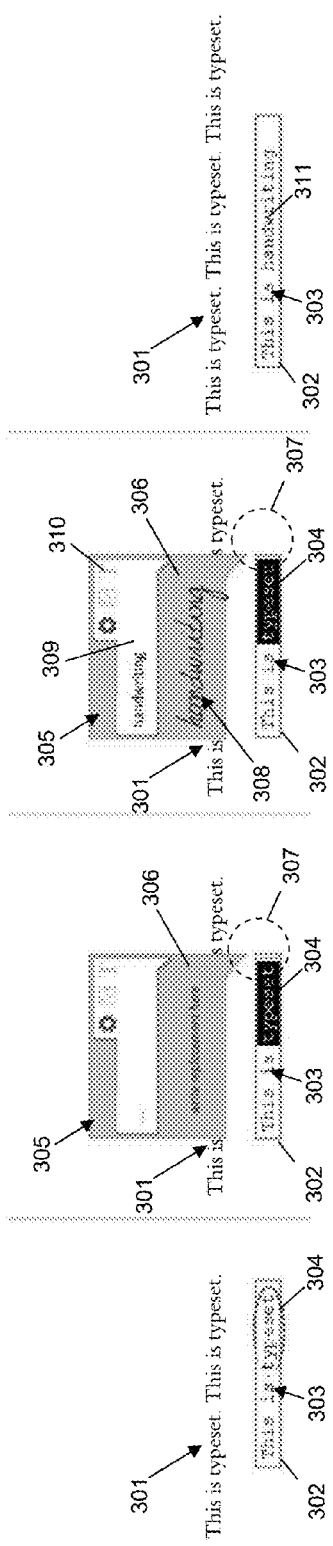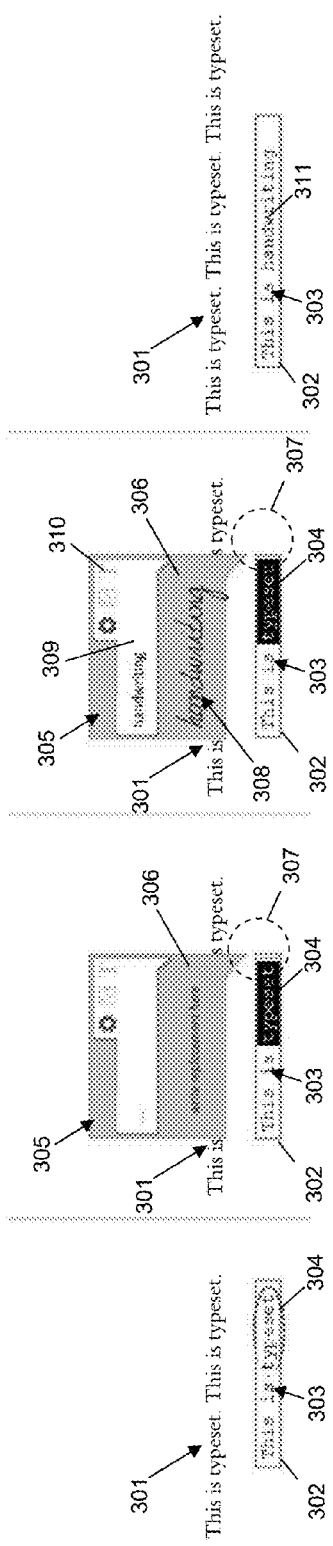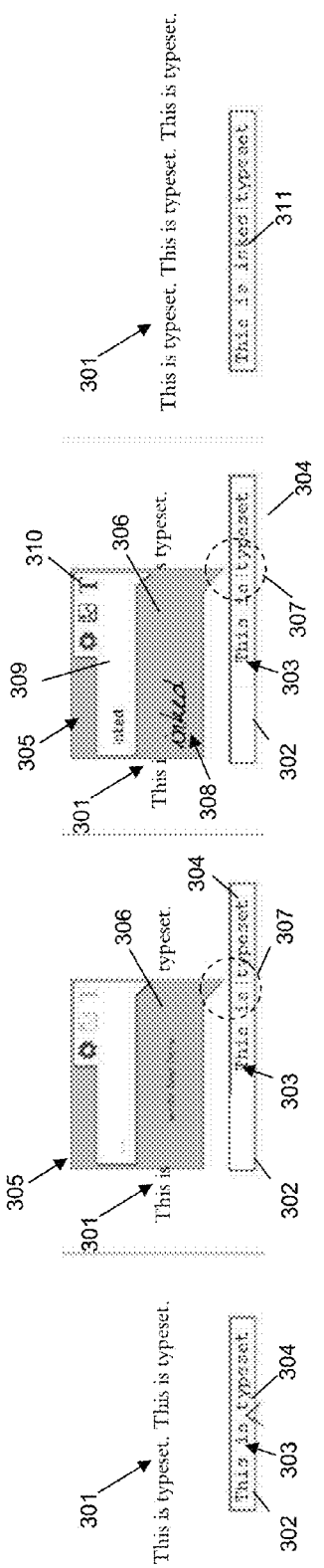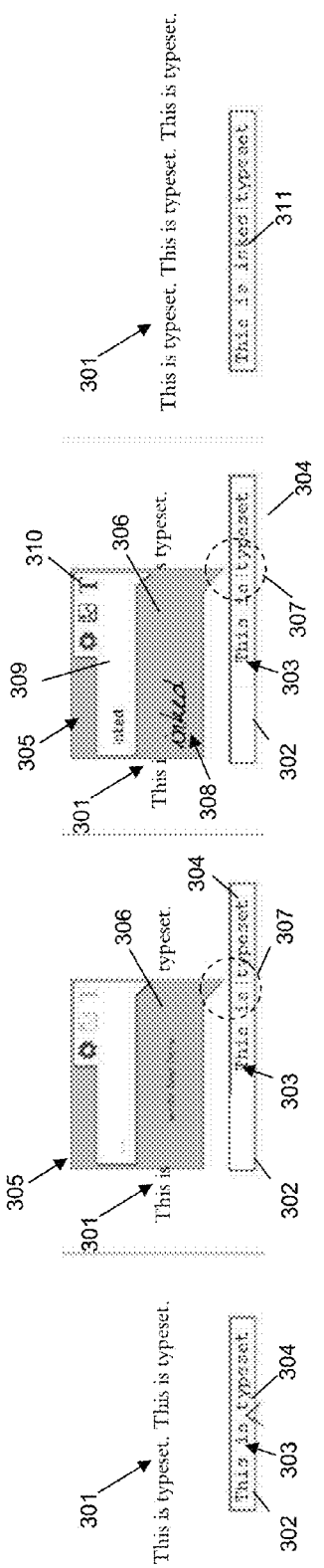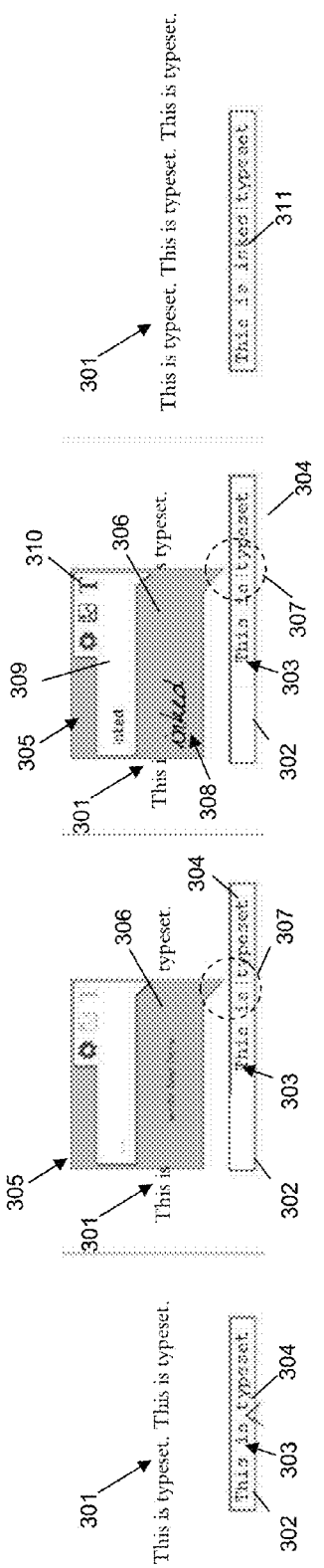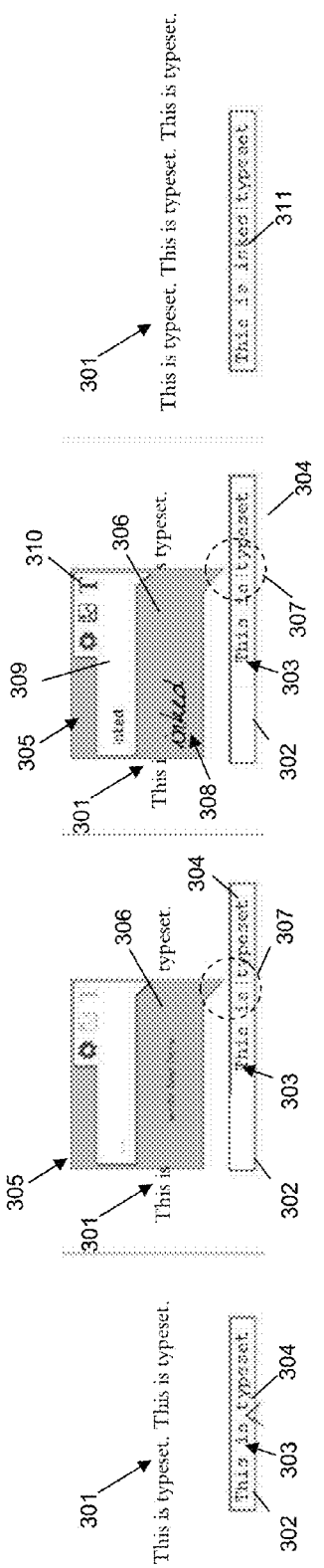

DISPLAYING AND INSERTING HANDWRITING WORDS OVER EXISTING TYPESET

BACKGROUND

Information handling devices ("devices"), for example cell phones, smart phones, tablet devices, laptop computers, and the like permit users to input handwriting using a finger or pen/stylus. This allows users to write more naturally and without the use of a keyboard.

Conventionally a handwriting field, box or pane is presented to the user as an overlay, e.g., a rectangle in a lower portion of a touch screen display. In this area the user may provide input handwriting strokes, e.g., letters, numbers, characters, symbols, etc. The device employs software that uses the input handwriting strokes, which are generally presented on screen to provide visual feedback to the user, as input by converting the handwriting stroke input locations on the touch screen into machine text according to the language setting of the device. Alternatively, a graphic or image of handwriting input may be placed into an underlying application, e.g., an image of the user's signature.

BRIEF SUMMARY

In summary, one aspect provides a method, comprising: accepting, in an overlay input application, one or more ink strokes provided to an input field overlay area; wherein the input field overlay area is located on top of an underlying application display; and providing, in the input field overlay area, an at least partially opaque background.

Another aspect provides an electronic device, comprising: an input and display device; a processor operatively coupled to the input and display device; and a memory that stores instructions executable by the processor to: accept, in an overlay input application, one or more ink strokes provided to an input field overlay area; wherein the input field overlay area is located on top of an underlying application display; and provide, in the input field overlay area, an at least partially opaque background.

A further aspect provides a product, comprising: a storage device having code stored therewith, the code being executable by a processor of an electronic device and comprising: code that accepts, in an overlay input application, one or more ink strokes provided to an input field overlay area; wherein the input field overlay area is located on top of an underlying application display; and code that provides, in the input field overlay area, an at least partially opaque background.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

BRIEF DESCRIPTION OF THE SEVERAL VIEWS OF THE DRAWINGS

FIG. 3(A-H) illustrates an example of an overlay input field used for editing.

DETAILED DESCRIPTION

Figure 1:
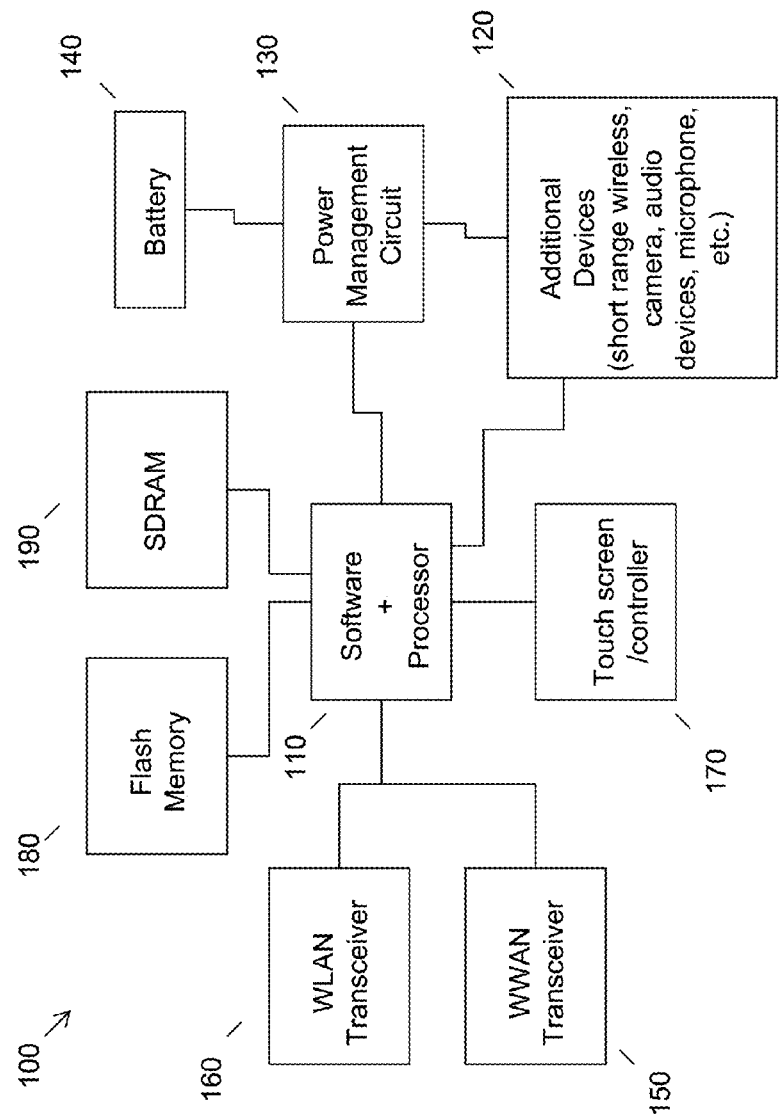
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Although conventional input method editors (IMEs) provide a user with the ability to input ink strokes (e.g., handwritten letters, numbers, or other characters), these tend provide an offset input overlay, e.g., a window or screen section presented at a different area than the underlying input field of an application. A common example is presentation of an overlay field at the lower portion of the screen for inputting ink strokes (converted to typeset) into an underlying input field (e.g., web browser search box), which itself is presented at an upper part of the screen.

In certain contexts, e.g., while editing where a user may wish to insert a new word between two prior words, the user may operate a conventional input overlay application to place a cursor in the middle of the two words and thereafter provide new ink strokes to the overlay at the bottom of the screen. For example, for inserting a new word, a user may provide ink strokes into a lower overlay field and these ink strokes are converted into typeset that is displayed in the underlying application field at another part of the screen. However, in an overlay input application that actually overlays the underlying input field or fields, i.e., an overlay input field that is co-located with the underlying field(s), in such editing contexts there will already be typeset present in the underlying input field(s).

When using a finger tip or pen/stylus (either active or passive) to input ink strokes (e.g., handwritten text) into an underlying input field that already contains text (e.g., machine typeset), the newly provided handwritten ink will be difficult to read. This is because the typeset text below the handwritten strokes will interfere visually with the handwritten ink and make it difficult for the user to see/understand the handwriting. The user needs to be able to read his or her own handwriting to make sure it will get converted to the correct typeset text, e.g., via a handwriting recognition process similar to optical character recognition (OCR).

Existing solutions that bring up a separate overlay field in a different location to allow the user to handwrite the text, e.g., where the on-screen soft keyboard is usually located, draw the user's attention away from the underlying application field, i.e., the location where the converted text will get inserted. This context switch can cause the user confusion and delay, e.g., if the user is trying to convert and insert a lot of handwritten ink into typeset text. For an overlay input application that co-locates the overlay field with the underlying input field(s), this visual offset is avoided. However, the confusing visual landscape will result if both the newly presented ink strokes and underlying typeset are both visually presented to the user.

Accordingly, an embodiment provides an overlay window or area that is co-located with (e.g., directly on top of) the underlying application's field(s) (and any existing typeset text). In an embodiment, during for example an editing session, the user is presented with a visual indication of the location of editing input. This gives the user a clear indication of where the text will get inserted within the existing typeset text in the underlying application. The overlay application's window or bubble may, for example, include a pointer or arrow that identifies directly where the cursor in underlying application's text field is and where the new input text will get inserted into the underlying application.

An embodiment may also adjust the background or opaqueness of the overlay input field. This provides the user with a full, empty background to write the new handwritten strokes so that the existing typeset text in the underlying application input field(s) does not interfere with the visual presentation of the ink. This allows the user to clearly see the ink input and be confident that the handwriting recognition engine will be able to successfully convert the ink, e.g., to type set. Additionally, since the overlay input field may be located in the exact same location as the underlying application's text input field (or nearly so), the user's attention remains on the application input field at hand, and not anywhere else on the screen. Furthermore, an opaque background (which may be colored) corresponding to the input overlay field area presents the user with a visual indication of where he or she may provide ink strokes.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additional devices 120 are commonly included, e.g., a camera, short range wireless devices, a microphone, etc. System 100 often includes a touch screen 170 for data input and display/rendering. System 100 also typically includes various memory devices, for example flash memory 180 and SDRAM 190.

Figure 2:
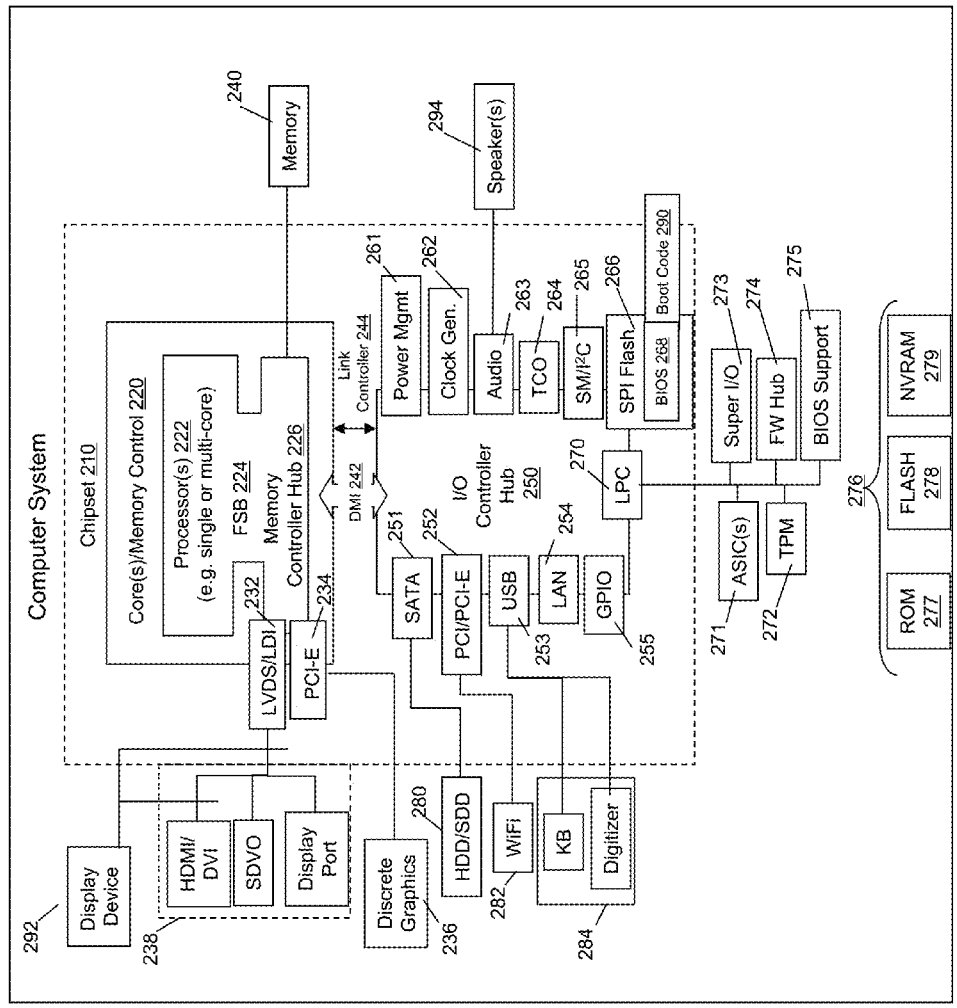
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, biometric input/security devices, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as tablets, smart phones, personal computer devices generally, and/or other electronic devices. Users may employ these devices for various functions, e.g., inputting handwriting strokes as an input modality to an Internet search application, an email application, a text messaging or instant messaging application, with fillable forms, etc. For example, the circuitry outlined in FIG. 1 may be implemented in a tablet or smart phone embodiment, whereas the circuitry outlined in FIG. 2 may be implemented in a laptop personal computer embodiment. In each case, the device may include an input and display device, e.g., a touch screen or the like, which acts to accept handwriting strokes and provides visual displays of input characters, conversions of handwritten characters or strokes to machine text, presentation of candidate handwriting recognition words and the like.

In FIG. 3(A-D) an example of providing an overlay input application 305 is illustrated. The overlay input application 305 is provided as an input method that converts handwriting inputs, e.g., indicated at 308 in FIG. 3C, into machine typeset. In some situations, e.g., as illustrated in FIG. 3A, typeset 301 is entered in the underlying application in a location that is proximate to an active input field 302. For example, the typeset indicated at 301 in FIG. 3A appears in the underlying application just above the active input field 302. Thus, as indicated in FIG. 3A, if a user provides an input such as a lasso pen input around a typeset word 304, the typeset word 304 will be highlighted for editing and an input overlay application 305 will be provided (FIG. 3B).

As illustrated by FIG. 3B the input overlay application 305 may include a sub-area that is visually coordinated with an input location 307, i.e., where additional or revised input will be inserted into existing typeset 302 of an active or focused field 302. This permits a user to know exactly where in the active field 302 typeset 303 any new input will be inserted.

As illustrated in FIG. 3B, the input overlay application 305 includes an input field overlay area 306 for inputting handwriting ink strokes. As shown, the input field overlay area 306 occludes the underlying typeset 301 via use of an opaque background. This provides a user with a clean background area 306 onto which new ink strokes may be provided.

The overlay input application 305 includes an area 309 that displays a typeset preview (FIG. 3C) and includes one or more soft controls. For example, as shown in FIG. 3C, an area 309 provides a typeset preview of the handwriting recognition result for the handwriting input 308 provided by the user to input field overlay area 306. The area 309 in the illustrated example includes settings, graphic input and typeset input soft controls 310. If a user provides handwriting input into area 306 and selects a soft control 310, e.g., "T" control for entering typeset, an embodiment inserts the new typeset derived from the handwriting input 308 into the active field 302 typeset 303 at the location indicated (307 of FIG. 3C) to form new typeset input 311.

FIG. 3(E-H) illustrates another example of providing an overlay input application 305. Here, rather than lasso input for a typeset word 304, a user has provided another pen gesture, in this case a carrot "^" gesture. This gesture may for example be programmed to bring up an overlay application 305 located at the area associated with the gesture. Here, the overlay input application is visually associated with location 307 as that is the location within the typeset 303 of the active field 302 indicated by the user's pen gesture.

Again, rather than providing a transparent background, the input field overlay area 306 is provided in an opaque manner (which may include semi-transparent background) such that the user is provided with a visually appealing area 306 in which to provide new ink strokes. As the user has provided new ink strokes, here "inked" as illustrated in FIG. 3G, the overlay input application 305 provides a typeset preview as well as soft controls in area 309. This permits a user to see the typeset of the handwriting as recognized by a handwriting recognition engine. In the example of FIG. 3(E-H), the new input is converted into typeset and inserted at location 307 as new typeset input 311.

In an embodiment, the overlay input application 305 may provide an opaque background only in certain circumstances, e.g., previously entered underlying typeset is present. However, an embodiment may provide an opaque background in other instances or continuously. By way of example, editing input contexts, e.g., where the user is interested in modifying previous input, are particularly appropriate for implementing an opaque background, as illustrated in FIG. 3(A-H). Thus, detection of other typeset or an editing gesture input may be used as a trigger for switching to an opaque background for the input field overlay area.

However, other contexts may be appropriate for use of an opaque background, rather than use of a transparent background, for the input field overlay area 306. A user may, for example, want the visual feedback of the opaque background area 306 and thus select it as an option. Likewise, an embodiment may determine that other visual qualities of the display (e.g., colors of underlying graphics, ink stroke display color, etc.) indicate that an opaque background and/or colored background may be more appropriate for area 306. A user may choose from among opaqueness settings (e.g., completely opaque, semi-transparent, etc.) or from among different colors, patterns, etc.

Figure 4:
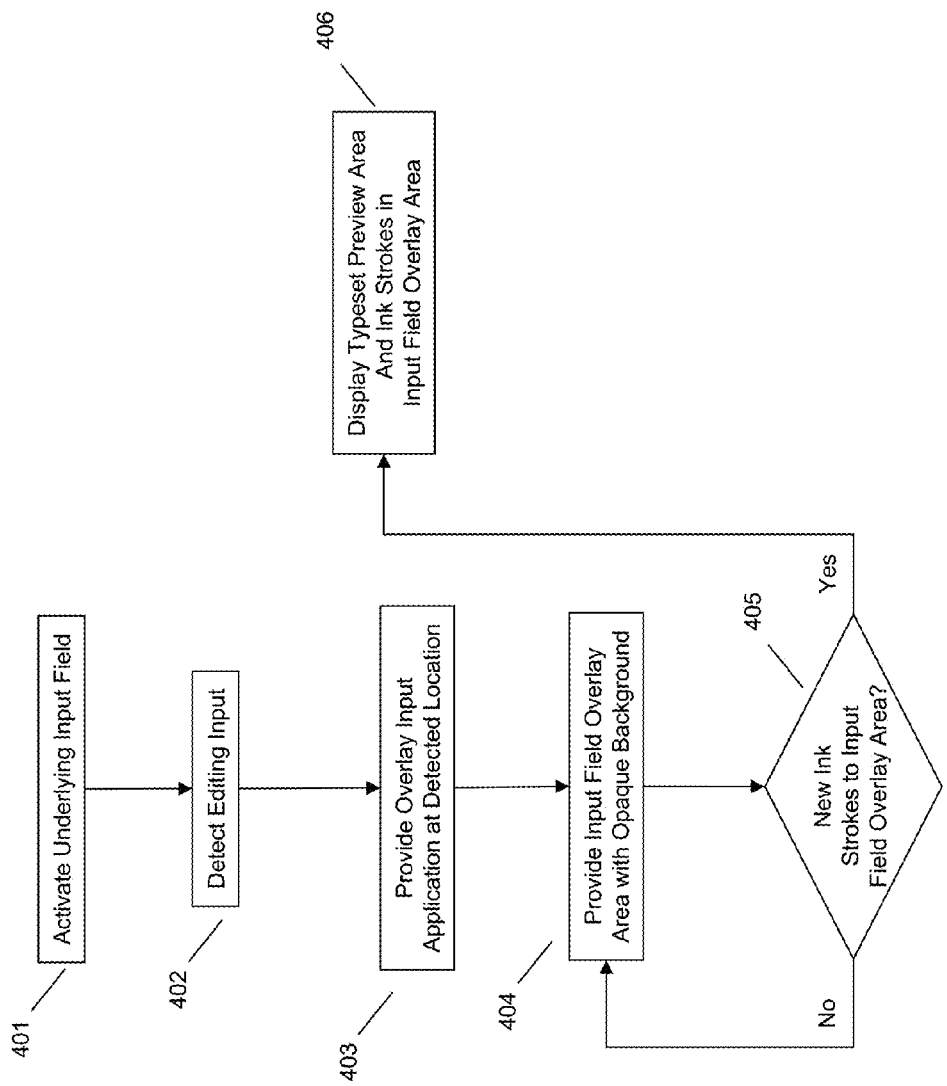
FIG. 4 illustrates an example method of displaying and inserting handwriting words over existing typeset.

As outlined in FIG. 4, an embodiment may detect that an input field for an underling application has been activated 401. If for example editing input is detected at 402, an embodiment may provide an overlay input application at the detected location 403, e.g., at a location of a word lassoed or associated with another pen gesture input.

In addition, as discussed herein, an embodiment may provide an overlay input field area with an opaque background at 404. This may be done in connection with other determinations, e.g., detection of other typeset in the underlying application, detection of a pen gesture, as in this example, or by default, as described herein. This presents the user with a visually clean background in which to provide further ink strokes.

If new ink strokes are detected at 405, an embodiment may display these in the input field overlay area having the opaque background as well as display an area containing a typeset preview (and soft controls) at 406. The opaque background thus overlays an underlying application display such that the existing typeset (e.g., typeset 301 of FIG. 3A) is occluded. The typeset may be derived from previously converted handwriting ink strokes input to the overlay input application or may be graphics or other content of the underlying application. The opaque background of the input field area displayed at 406 may underlie the area displaying a typeset preview for the new ink strokes. As described, the overlay input application may include an indicator associated with and/or within underlying typeset of an underlying application to apprise the user of the location of text insert.

An embodiment therefore represents a technical improvement in generating an input area to be presented to a user for handwriting or ink mode. This assists the user by more intelligently linking the quality of the input area to the context of handwriting or ink input. The various embodiments produce an input modality that more closely match the user's needs by taking into consideration the visual context into which handwriting or other ink input is provided.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions that are executed by a processor and stored on a device readable storage medium, referred to herein as a non-signal storage device. A non-signal storage device may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a non-signal storage device is not a signal, is non-transitory, and "non-transitory" includes all media except signal media.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a special purpose information handling device or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
   accepting, in an overlay input application, one or more ink strokes provided to an input field overlay area;
   wherein the input field overlay area is located on top of an underlying application display;
   providing, in the input field overlay area, a background; and
   displaying an indicator associated with underlying typeset of an underlying application, wherein the indicator displays an insert location for input.

2. The method of claim 1, wherein the background is based on the underlying application display.

3. The method of claim 1, wherein the underlying application display is a text field including typeset.

4. The method of claim 3, wherein the typeset is derived from converted handwriting ink strokes previously provided to the overlay input application.

5. The method of claim 1, wherein the background is visually distinguished from an area displaying a typeset preview for the one or more ink strokes.

6. The method of claim 1, wherein the background comprises the indicator.

7. The method of claim 1, wherein the indicator includes a cursor.

8. The method of claim 1, wherein the background is colored.

9. An electronic device, comprising:
   an input and display device;
   a processor operatively coupled to the input and display device; and
   a memory that stores instructions executable by the processor to:
   accept, in an overlay input application, one or more ink strokes provided to an input field overlay area;

wherein the input field overlay area is located on top of an underlying application display;

provide, in the input field overlay area, a background; and display an indicator associated with underlying typeset of an underlying application, wherein the indicator displays an insert location for input.

10. The electronic device of claim 9, wherein the background is based on the underlying application display.

11. The electronic device of claim 9, wherein the underlying application display is a text field including typeset.

12. The electronic device of claim 11, wherein the typeset is derived from converted handwriting ink strokes previously provided to the overlay input application.

13. The electronic device of claim 9, wherein the background is visually distinguished from an area displaying a typeset preview for the one or more ink strokes.

14. The electronic device of claim 9, wherein the background comprises the indicator.

15. The electronic device of claim 9, wherein the indicator includes a cursor.

16. A product, comprising:

a non-transitory storage device having code stored therewith, the code being executable by a processor of an electronic device and comprising:

code that accepts, in an overlay input application, one or more ink strokes provided to an input field overlay area;

wherein the input field overlay area is located on top of an underlying application display;

code that provides, in the input field overlay area, a background; and code that displays an indicator associated with underlying typeset of an underlying application, wherein the indicator displays an insert location for input.

* * * * *